United States Patent [19]

Nilsson

[11] Patent Number: 5,176,510
[45] Date of Patent: Jan. 5, 1993

[54] DEVICE FOR DISPENSING FLUID THAT INCLUDES A VALVE WHICH COMMUNICATES WITH A PUMP

[75] Inventor: Billy Nilsson, Mjölby, Sweden

[73] Assignee: Sterisol AB, Vadstena, Sweden

[21] Appl. No.: 818,155

[22] Filed: Jan. 8, 1992

Related U.S. Application Data

[62] Division of Ser. No. 655,858, Feb. 15, 1991, Pat. No. 5,099,885.

[30] Foreign Application Priority Data

Feb. 16, 1990 [SE] Sweden ................. 9000568
Aug. 28, 1990 [SE] Sweden ................. 9002753

[51] Int. Cl.⁵ ............................................. F16K 15/14
[52] U.S. Cl. ..................... 417/479; 222/207; 222/494
[58] Field of Search ............... 137/852; 417/479; 222/207, 209, 494

[56] References Cited

U.S. PATENT DOCUMENTS 3,931,831 1/1976 French .................. 137/852
4,101,057 7/1978 Lomaglio .............. 417/479 X Primary Examiner—Robert G. Nilson
Attorney, Agent, or Firm—Burns, Doane, Swecker & Mathis

[57] ABSTRACT

A valve for dispensing a preferably viscous fluid is adapted in connection with the dispensing operation to open under the action of a positive pressure in the fluid, produced e.g. by means of a pump (1), and to close by itself when the positive pressure, and thus the dispensing operation, has ceased. The valve (2) has a channel (9) with an inlet and an outlet end (9a; 9b) and an axial direction of fluid flow (10). The channel (9) is defined by a body portion (11) of rigid material and a cover portion (12) of flexible material. The body portion (11) is formed with a groove (13) of substantially arcuate cross-section. The edges of the cover portion (12) extending in the direction of flow (10) are sealingly connected to the body portion (11). Towards the outlet end (9b), the cover portion conforms to the shape of the groove (13). The cover portion (12) is prestressed to sealingly engage the wall of the groove (13) with a certain engagement pressure.

8 Claims, 1 Drawing Sheet

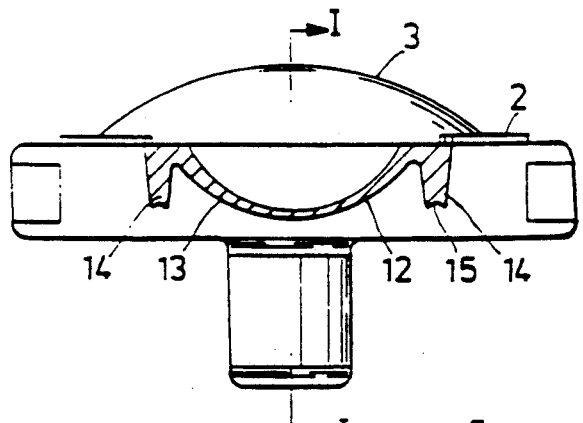
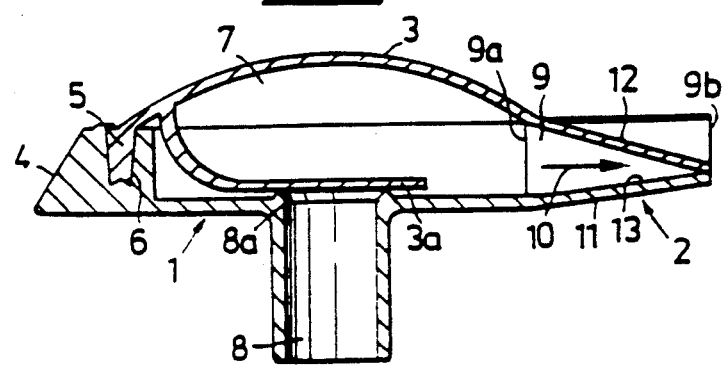
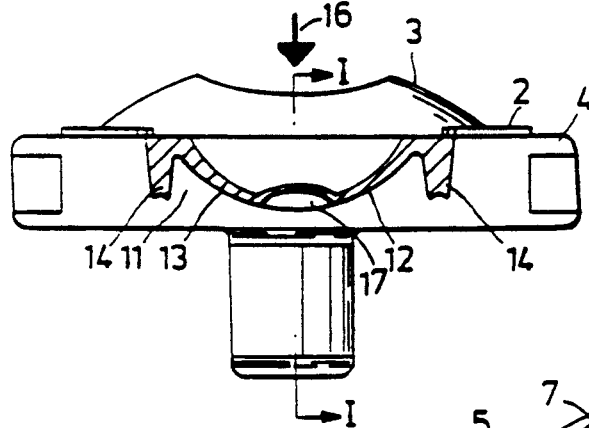
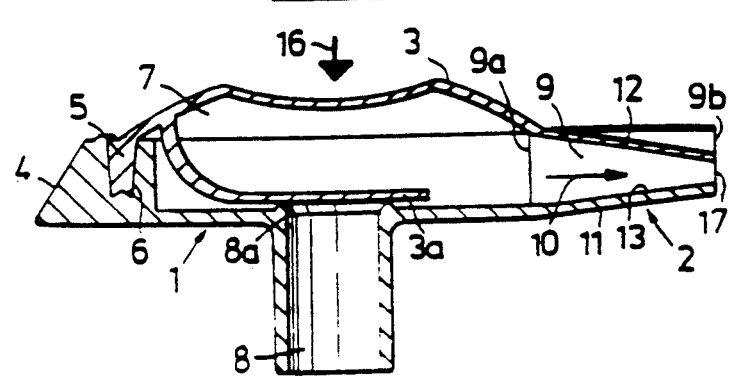

DEVICE FOR DISPENSING FLUID THAT INCLUDES A VALVE WHICH COMMUNICATES WITH A PUMP

This application is a divisional of application Ser. No. 07/655,858, filed Feb. 15, 1991 now U.S. Pat. No. 5,099,885.

The present invention relates to a valve for dispensing a preferably viscous fluid, said valve being adapted in connection with the dispensing operation to open under the action of a positive pressure in the fluid, produced e.g. by means of a pump, and to close by itself when the positive pressure, and thus the dispensing operation, has ceased. The valve has a channel with an inlet and an outlet end and an axial direction of fluid flow.

U.S. application Ser. No. 2753091, U.S. application Ser. No. 3820689 and U.S. application Ser. No. 3991916 are examples of the prior art in this field.

U.S. application Ser. No. 2753091 describes a closure for tubes and the like, comprising a tubular sleeve of elastic material. At one end, the discharge end, the sleeve is flattened by a convex means, the two opposite side edges of the flattened sleeve end being fixed by said means. The closure is maintained closed in that the walls of the flattened sleeve are retained in a tensioned condition over the convex means. By the action of the pressure from a fluid to be dispensed, the closure is opened by flexing away the sleeve wall remote from said means. When the fluid pressure ceases, the closure closes. This closure lacks a distinct switching between the open and the closed state and therefore is not capable of offering an aseptic closure.

U.S. application Ser. No. 3820689 discloses a dispensing spout having a discharge valve. This consists of a lip of elastic material covering an outlet opening surrounded by an annular flange which the lip sealingly engages. In connection with the dispensing operation, the lip is raised under the action of the fluid pressure, thus uncovering the outlet opening so that fluid can pass through it. When the fluid pressure ceases, the lip is lowered, covering again the outlet opening. This discharge valve, too, has no distinct switching between the open and the closed state and therefore does not offer an aseptic closure.

U.S. application Ser. No. 3991916 concerns a pressure container with a dispensing valve consisting of a rigid concave wall portion and a flexible convex wall portion. The flexible wall portion is prestressed to engage an above said flexible wall portion situated lip portion which in a closed position of the valve exerts a force directed against the rigid wall portion to create a hermetic sealing. The flexible wall portion does not engage the rigid wall portion by its own force and at dispensing the above mentioned lip portion must be lifted. Thus, the dispensing valve described is fairly complicated and therefore expensive to manufacture.

The object of the present invention is to provide an inexpensive, simple and efficient discharge valve exhibiting a distinct switching between the open and the closed state and ensuring adequate sealing as near to the surrounding atmosphere as possible. According to the invention, this object is achieved by means of a valve for dispensing a fluid, which is adapted in connection with the dispensing operation to open under the action of a positive pressure in the fluid, produced e.g. by means of a pump, and to close by itself when said positive pressure has ceased, as recited in the claims. More specifically, the valve comprises a channel with an inlet and an outlet end and an axial direction of fluid flow. The channel is defined by a body portion of rigid material formed with a groove of substantially arcuate cross-section, and by a cover portion of flexible material whose side edges extending in the direction of flow are sealingly connected to the body portion and gradually conform towards the outlet end to the shape of the groove. The flexible cover portion is prestressed to sealingly engage the wall of the groove with a certain engagement pressure in a region at the outlet end of the channel. Due to the prestressing, the flexible cover portion sealingly engages the outlet end of the body portion by its own force as long as the pressure inside the channel does not exceed beyond a predetermined value. The sealing connection between the side edges of the cover portion and the body portion is preferably provided by grooves in the body portion and mating, flange-like projections on the cover portion.

For achieving optimal function, it is suitable that the groove is so shaped that its cross-section, at least at the outlet end, substantially defines the arc of an imaginary sector of a circle whose angle between the two straight lines is from 5 to 40 degrees, preferably from 20 to 40 degrees. It is also preferred that the cover portion has an increasing thickness towards the side edges as seen in a section transversely of the direction of flow.

To facilitate manufacturing, it is advantageous, according to a special feature of the invention, to provide a valve which communicates at its inlet end with a pump comprising, in addition to the required non-return valve means, a mechanically actuated dome forming with the cover portion an integral unit whose edge is sealingly connected to a housing provided on the body portion and mating with the dome. Preferably the dome is square shaped.

Additional features and advantages of the inventive valve will appear from the other subclaims and the following description with reference to the accompanying drawings, in which FIGS. 1a and 1b are schematic front views of a preferred embodiment of a valve according to the invention when in the closed state and when dispensing a fluid, respectively.

FIGS. 2a and 2b are sections taken along the line I—I in FIGS. 1a and 1b, respectively.

Although the valve according to the invention is shown in the drawing and described in the following description in association with a pump of a special design, it is obvious that the valve can also be used both with a pump having another design and operating according to another principle, as well as with a tube.

In the drawings, a pump is generally designated 1, and a valve according to the invention associated with the pump 1 is generally designated 2. The pump 1 has a dome 3 of flexible material which is to be mechanically actuated, and a housing 4 of rigid material. The dome 3 is sealingly connected to the housing 4 by means of a mounting flange 5 engaging in a groove 6 in the housing 4, whereby the dome 3 and the housing 4 define a chamber 7 whose volume can be varied by mechanical actuation of the dome 3, as illustrated in FIGS. 1b and 2b. Preferably, the dome is square shaped (as seen from above), which facilitates deformation thereof. In the housing opens a channel 8 communicating with a fluid container (not shown), the contents of which are to be dispensed through the valve 2. The mouth 8a of the channel 8 forms together with a tongue 3a extended from the dome 3, a non-return valve preventing the fluid from flowing from the chamber 7 back into the fluid container through the channel 8.

The valve 2 has a channel 9 which extends between an inlet end 9a opening in the chamber 7, and an outlet end 9b, and defines a direction of fluid flow indicated by an arrow 10.

According to the invention, the channel 9 is defined by a body portion 11 of rigid material and by a cover portion 12 of flexible material. In the embodiment shown in the drawings, the body portion 11 preferably is integrally formed with the housing 4, for instance from injectionmoulded polypropylene or polyethylene, and the cover portion 12 integrally formed with the dome 3, for instance from vacuum-formed thermoplastic polyethylene. It is however obvious to a person skilled in the art that all materials having suitable mechanical properties can be used. The body portion is formed with a groove 13 having arcuate cross-section and suitably being so shaped that its cross-section, at least at the outlet end 9b, substantially defines the arc of an imaginary sector of a circle whose angle between the two imaginery straight lines passing through end points of the arc and a center of the circle is from 5 to 40 degrees, preferably from 20 to 40 degrees. Like the dome 3, the cover portion 12 is sealingly connected to the body portion 11 by mounting flanges 14 which at the respective edges of the cover portion 12 extend in the direction of flow 10 and engage in mating grooves 15 in the body portion 11. Towards the outlet end 9b, the cover portion 12 gradually conforms to the shape of the groove 13 and is caused in one region to sealingly engage the wall of the groove 13. This sealing engagement is enhanced by the combination of the concave shape of the cover portion 12 and its mounting in the body portion 11, and by the fact that the thickness of the cover portion is smaller at the center of the cover portion than at the edges thereof, as appears from FIGS. 1a and 1b.

In operation, the invented valve 2 operates as follows. For the sake of simplicity, it is assumed that the chamber 7 is filled with a fluid from a container (not shown) to be dispensed through the valve 2.

Upon mechanical actuation of the dome 3, indicated by an arrow 16 in FIGS. 1b and 2b and provided by a pressure exerted on the dome, e.g. by a finger, a positive pressure is created in the fluid. This positive pressure propagates through the channel 9 and imparts to the cover portion 12 a locally convex shape in the region where it engages the wall of the groove 13, as illustrated in FIG. 1b. The instantaneous formation of this convex shape is facilitated by said thickness distribution of the cover portion and produces an opening 17 through which the fluid can pass. As a result, the positive pressure in the chamber 7 and the channel 9 is equalized and dispensing is discontinued. As long as the positive pressure prevails, the valve 2 automatically closes and acts as a non-return valve 3a, 8a. When the mechanical actuation of the dome ceases, it resumes its initial shape, a negative pressure being created and fluid being again sucked into the chamber 7 through the channel 8. Thanks to the switching of the cover portion 12 between convex and concave shape, the opening and the closure of the valve become highly distinct. This prevents fluid from remaining between the cover portion 12 and the wall of the groove 13, which assists in providing an aseptic closure. The arrangement now described is especially suitable for dispensing viscous fluids, such as liquid detergents, from containers whose volume decreases upon emptying, especially containers including flexible bags or one or more flexible walls.

I claim:

1. Device for dispensing a fluid comprising a pump and a valve, said valve comprising a channel having an inlet end and an outlet end and defining an axial direction of fluid flow, the valve communicating at its inlet end with the pump and being adapted in connection with a dispensing operation to open under the action of a positive pressure in the fluid and to close by itself when said positive pressure has ceased, the channel being defined by a body portion of rigid material formed with a groove of substantially arcuate cross-section and by a cover portion of flexible material having side edges that extend in the direction of flow, said side edges being sealingly connected to the body portion and gradually conforming towards the outlet end to the shape of the groove, said flexible cover portion being prestressed to sealingly engage a wall of the groove with an engagement pressure in a region at the outlet end of the channel and said pump comprising non-return valve means and a mechanically actuated dome, said dome forming with the cover portion an integral unit and said dome having an edge that is sealingly connected to a housing of the pump, said housing of the pump being provided on the body portion of the valve.

2. The device according to claim 1, wherein the sealing connection between the side edges of the cover portion and the body portion is defined by grooves formed in the body portion and mating projections formed on the cover portion.

3. The device according to claim 2, wherein said cover portion is of increasing thickness towards the side edges as seen in a section transverse to said axial direction of fluid flow.

4. The device according to claim 1, wherein said cover portion is of increasing thickness towards the side edges as seen in a section transverse to said axial direction of fluid flow.

5. The device according to claim 3, wherein said groove is designed such that its cross-section, at least at said outlet end, substantially defines the arc of an imaginary sector of a circle whose angle between two straight lines is from about 5 degrees to about 40 degrees, said two straight lines passing through end points of the arc and a center of the circle.

6. The device according to claim 1, wherein said groove is designed such that its cross-section, at least at said outlet end, substantially defines the arc of an imaginary sector of a circle whose angle between two straight lines is from about 5 degrees to about 40 degrees, said two straight lines passing through end points of the arc and a center of the circle.

7. The device according to claim 5, wherein said dome is square shaped.

8. The device according to claim 1, wherein said dome is square shaped.

* * * * *